US012708098B2

(12) United States Patent
Abel et al.

(10) Patent No.: US 12,708,098 B2
(45) Date of Patent: Aug. 18, 2026

(54) PET CUSHION WITH LIQUID IMPERMEABLE COVERS

(71) Applicant: Purple Innovation, LLC, Alpine, UT (US)

(72) Inventors: John Nathan Abel, Smithfield, UT (US); Terry V. Pearce, Alpine, UT (US); Dhyey Acharya, Lehi, UT (US); Shawn David Moon, Cedar Hills, UT (US)

(73) Assignee: Purple Innovation, LLC, Lehi, UT (US)

(*) Notice: Subject to any disclaimer, the term of this patent is extended or adjusted under 35 U.S.C. 154(b) by 614 days.

(21) Appl. No.: 15/861,278

(22) Filed: Jan. 3, 2018

(65) Prior Publication Data

US 2019/0200570 A1 Jul. 4, 2019

(51) Int. Cl.
*A01K 1/035* (2006.01)

(52) U.S. Cl.
CPC .................................. *A01K 1/0353* (2013.01)

(58) Field of Classification Search
CPC .... A01K 1/0353; A01K 1/035; A47C 27/005; A47C 27/144; A47C 27/148; A47C 27/15
USPC ........................................................ 119/28.5
See application file for complete search history.

(56) References Cited

U.S. PATENT DOCUMENTS 3,336,610 A * 8/1967 Geddings ............... A47D 15/00 5/923
3,742,531 A * 7/1973 Alsbury ............... A47C 27/085 5/680
4,369,284 A 1/1983 Chen
5,226,384 A 7/1993 Jordan
5,749,111 A * 5/1998 Pearce .................. C08L 51/006 5/654
5,819,688 A * 10/1998 Walker ................. A01K 1/0157 119/169
5,994,450 A 11/1999 Pearce
6,269,768 B1 8/2001 Zartman
6,280,120 B1 * 8/2001 Okamoto .................. E02D 5/60 405/257
6,363,890 B1 * 4/2002 Beck .................... A01K 1/0107 119/28.5
7,051,389 B2 * 5/2006 Wassilefky .............. A47G 9/10 5/490
7,076,822 B2 7/2006 Pearce
7,185,604 B2 * 3/2007 Holte ................... A01K 1/0353 119/28.5
7,434,748 B2 10/2008 Takada et al.
7,730,566 B2 6/2010 Flick et al.
7,964,664 B2 6/2011 Pearce
(Continued)

FOREIGN PATENT DOCUMENTS

BR 202018009786 U2 * 11/2018 ................... 119/28.5

*Primary Examiner* — Arfan Y. Sinaki
(74) *Attorney, Agent, or Firm* — Foley & Lardner LLP

(57) ABSTRACT

A pet cushion comprises a cushioning element including an elastomeric material layer and at least one foam layer coupled to the elastomeric material layer. The elastomeric material layer includes a plurality of intersecting buckling walls defining hollow columns therebetween. An interior cover, which is impermeable to liquid, encloses the cushioning element. An exterior cover encloses the first cover and the cushioning element. The exterior cover comprises a material different from a material of the interior cover.

14 Claims, 2 Drawing Sheets

(56) References Cited

U.S. PATENT DOCUMENTS 8,075,981 B2 12/2011 Pearce et al.
8,087,111 B2 * 1/2012 Paris .................... A47G 9/0253 5/699
8,245,341 B2 * 8/2012 Oh ....................... A47C 27/144 5/722
8,349,444 B2 * 1/2013 Kipp ....................... C04B 28/26 428/318.4
8,434,748 B1 5/2013 Pearce et al.
8,464,657 B1 * 6/2013 King .................... A01K 1/0353 119/28.5
8,628,067 B2 1/2014 Pearce et al.
8,707,904 B2 * 4/2014 Ertel .................... A01K 1/0158 119/28.5
8,919,750 B2 * 12/2014 Pearce ..................... A47C 7/02 267/153
8,932,692 B2 1/2015 Pearce
9,049,944 B2 * 6/2015 Chen .................... A47C 27/085
9,572,431 B2 * 2/2017 Khanzadian ........... A47C 7/021
9,814,324 B2 * 11/2017 Scarleski ............. A47C 31/105
10,206,512 B2 * 2/2019 Kim ......................... A47B 3/10
10,413,442 B2 * 9/2019 Tabor ..................... A47C 27/22
2002/0056418 A1 * 5/2002 Fleming ............... A47C 27/001 119/28.5
2003/0163870 A1 9/2003 Porter et al.
2005/0224000 A1 10/2005 Holte
2006/0272582 A1 * 12/2006 Dunn ................... A01K 1/0353 119/28.5
2007/0125313 A1 * 6/2007 Fleetwood ........... A01K 1/0353 119/721
2008/0104753 A1 * 5/2008 Kajdas ................... A47C 31/00 5/737
2008/0202665 A1 8/2008 Seago
2008/0222808 A1 * 9/2008 Bell ..................... A47C 31/105 5/500
2011/0252822 A1 * 10/2011 Prendergast ......... A01K 1/0158 62/259.3
2011/0256380 A1 * 10/2011 Chandler ................. A47G 9/10 428/317.1
2011/0290834 A1 * 12/2011 Pelz ..................... A01K 1/0353 224/259
2012/0073504 A1 * 3/2012 Diamond ............. A01K 1/0353 119/28.5
2012/0118239 A1 * 5/2012 Jacquart ............... A01K 1/0353 119/28.5
2012/0192357 A1 * 8/2012 Melsen ................ A47C 27/148 5/722
2012/0199074 A1 * 8/2012 Song .................... A01K 1/0353 119/28.5
2012/0255120 A1 10/2012 Poston et al.
2012/0260421 A1 * 10/2012 DeGregorio ....... A47G 27/0206 5/417
2012/0291711 A1 * 11/2012 Baker .................. A01K 1/0353 119/28.5
2013/0111672 A1 * 5/2013 Rensink ................. A47C 27/15 5/698
2013/0167302 A1 * 7/2013 Pearce ................. A47C 27/144 5/739
2013/0186341 A1 * 7/2013 McCormack .......... A01K 29/00 119/28.5
2013/0247828 A1 * 9/2013 Tedaldi ................ A01K 1/0353 119/28.5
2013/0291801 A1 * 11/2013 Throndsen ............. A01K 29/00 119/28.5
2014/0141233 A1 * 5/2014 Crawford ................. C08K 5/03 428/319.7
2014/0165923 A1 * 6/2014 Diamond ............. A01K 1/0353 119/706
2014/0183403 A1 * 7/2014 Peterson .................. C09K 5/14 252/75
2014/0202390 A1 * 7/2014 McNamara .......... A01K 1/0157 119/6.8
2014/0251219 A1 * 9/2014 Rawls-Meehan ...... A47C 7/027 119/28.5
2014/0261190 A1 9/2014 Landers
2015/0090190 A1 * 4/2015 Diskin ................. A01K 1/0353 119/482
2015/0187233 A1 * 7/2015 Jensen ...................... G09F 3/02 427/256
2016/0192617 A1 * 7/2016 Murphy ............... A01K 1/0353 119/28.5
2016/0262403 A1 * 9/2016 Peterson ............ C08G 18/6492
2016/0262561 A1 * 9/2016 Pearce ............... A47G 27/0212
2016/0324328 A1 * 11/2016 Tabor ...................... A61F 13/47
2017/0079238 A1 * 3/2017 Renforth ................ A01K 1/033
2017/0238717 A1 * 8/2017 Jensen ................. A47C 31/105
2017/0251638 A1 * 9/2017 Staloch .................. A01K 19/00
2017/0251825 A1 * 9/2017 Pearce ................. A47C 27/086
2017/0280679 A1 * 10/2017 Swedyk ............... A01K 13/001
2018/0279795 A1 * 10/2018 Murphy ................. A47C 27/15
2019/0098860 A1 * 4/2019 Gaskill ...................... H05F 3/02
2019/0110432 A1 * 4/2019 Chen .................... A01K 1/0353
2019/0150629 A1 * 5/2019 Pearce .................. A47C 27/00
2019/0150631 A1 * 5/2019 Pearce ................. A47C 27/088

* cited by examiner

PET CUSHION WITH LIQUID IMPERMEABLE COVERS

TECHNICAL FIELD

Embodiments of the disclosure relate generally to a cushion including an elastomeric material layer that provides support to a person or animal, particularly domestic pets, thereon.

BACKGROUND

Pet cushions commonly include an outer casing or shell structure filled with a cushioning material such as cotton, polyester, or foam. While these cushions may provide a comfortable resting surface for the animal, these cushions may absorb liquid including rain water, urine, animal saliva, and various other spilled substances such that the cushions may become saturated and begin to deteriorate or rot. Once these cushions become saturated with such liquids, it is extremely difficult and sometimes impossible to thoroughly clean them. Further, repeatedly washing these cushions may cause deterioration of the structure of the cushion, which may ineffectively distribute load applied by the animal on the cushion leading to discomfort of the animal using the cushion.

Over a period of time, the cushion may begin to promote bacterial growth due to the buildup of moisture and heat. This, in turn, leads to an extremely unhealthy environment for the animal to be lying on, and often causes skin rashes and other related skin conditions. The body heat absorbed from the animal lying thereon also provides an excellent breeding environment for fleas, ticks, and other parasites which eventually attack the animal lying on the mattress.

BRIEF SUMMARY

In some embodiments, a pet cushion comprises a cushioning element including an elastomeric material layer and at least one foam layer coupled to the elastomeric material layer, an interior cover enclosing the cushioning element, and an exterior cover enclosing the first cover and the cushioning element. The interior cover is impermeable to liquid and comprises a material different from a material of the exterior cover.

In other embodiments, a pet cushion comprises a cushioning element including an elastomeric material layer and at least one foam layer coupled to the elastomeric material layer, an interior cover permanently enclosing the cushioning element, and an exterior cover enclosing the first cover and the cushioning element. The interior cover is impermeable to liquid, and the interior cover and the cushioning element are repeatedly removable from the exterior cover.

In yet other embodiments, a cushioning element includes an elastomeric material layer and at least one foam layer coupled to the elastomeric material layer, at least one cover enclosing the cushioning element, and at least one liquid impermeable coating provided on interior surfaces of the at least one cover. The elastomeric material layer comprises a plurality of intersecting buckling walls defining hollow columns therebetween.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
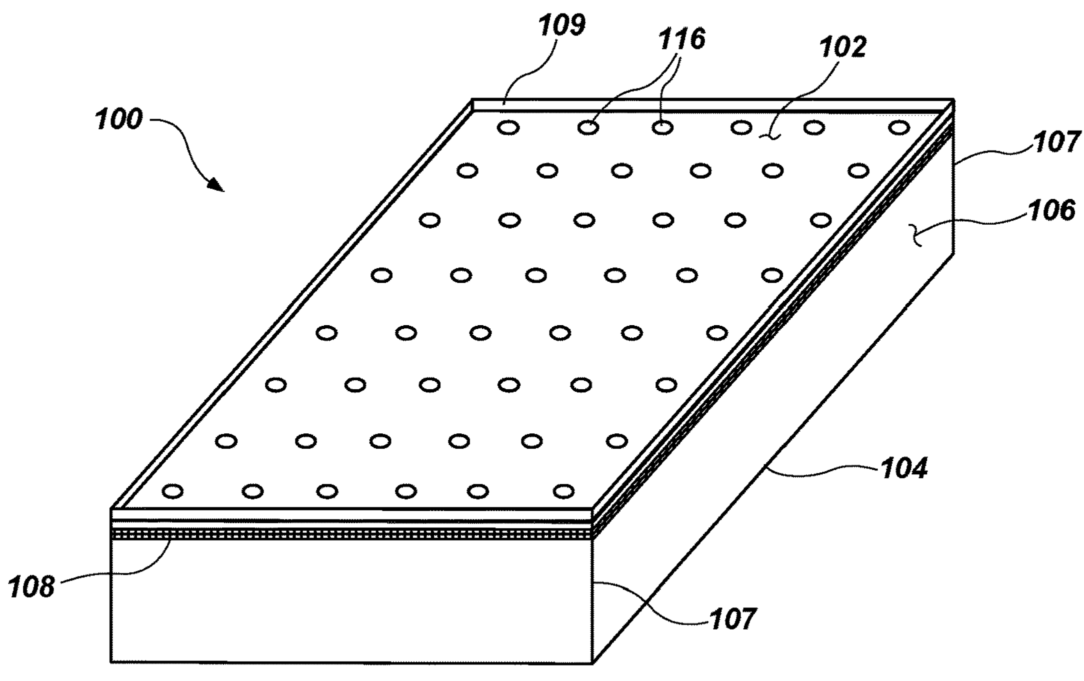
FIG. 1 is a perspective view of an exterior, first cover for a cushion in a closed state according to embodiments of the present disclosure.

The illustrations presented herein are not meant to be actual views of any particular component, device, or system, but are merely idealized representations that are employed to describe embodiments of the present disclosure. Elements common between figures may retain the same numerical designation.

As used herein, the term “elastomeric polymer” means and includes a polymer capable of recovering its original size and shape after deformation. In other words, an elastomeric polymer is a polymer having elastic or viscoelastic properties. Elastomeric polymers may also be referred to as “elastomers” in the art. Elastomeric polymers include, without limitation, homopolymers (polymers having a single chemical unit repeated) and copolymers (polymers having two or more chemical units).

As used herein, the term “elastomeric block copolymer” means and includes an elastomeric polymer having groups or blocks of homopolymers linked together, such as A-B diblock copolymers and A-B-A triblock copolymers. A-B diblock copolymers have two distinct blocks of homopolymers. A-B-A triblock copolymers have two blocks of a single homopolymer (A) each linked to a single block of a different homopolymer (B).

As used herein, the term “plasticizer” means and includes a substance added to another material (e.g., an elastomeric polymer) to increase a workability of the material. For example, a plasticizer may increase the flexibility, softness, or extensibility of the material. Plasticizers include, without limitation, hydrocarbon fluids, such as mineral oils. Hydrocarbon plasticizers may be aromatic or aliphatic.

As used herein, the term “elastomeric material” means and includes elastomeric polymers and mixtures of elastomeric polymers with plasticizers and/or other materials. Elastomeric materials are elastic (i.e., capable of recovering size and shape after deformation). Elastomeric materials include, without limitation, materials referred to in the art as “elastomer gels,” “gelatinous elastomers,” or simply “gels.”

As used herein, any relational term, such as “first,” “second,” “top,” “bottom,” etc., is used for clarity and convenience in understanding the disclosure and accompanying drawings and does not connote or depend on any specific preference, orientation, or order, except where the context clearly indicates otherwise.

As used herein, the terms “comprising,” “including,” “containing,” “characterized by,” and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the term "and/or" means and includes any and all combinations of one or more of the associated listed items.

The present disclosure describes a cushion that may be disposed over a flooring surface and may be used to provide support to a person or animal, particularly domestic pets, standing, laying, sitting, or kneeling thereon. The cushion may comprise a cushioning element, which desirably deforms to reduce peak pressure and increase comfort for the person or animal supported thereon. The cushioning element may be provided within one or more covers to protect the cushioning element from soiling by the person or animal intended to use the cushion and to provide the cushion with resistance against wear and tear, odor, stain, and other contamination.

Figure 2:
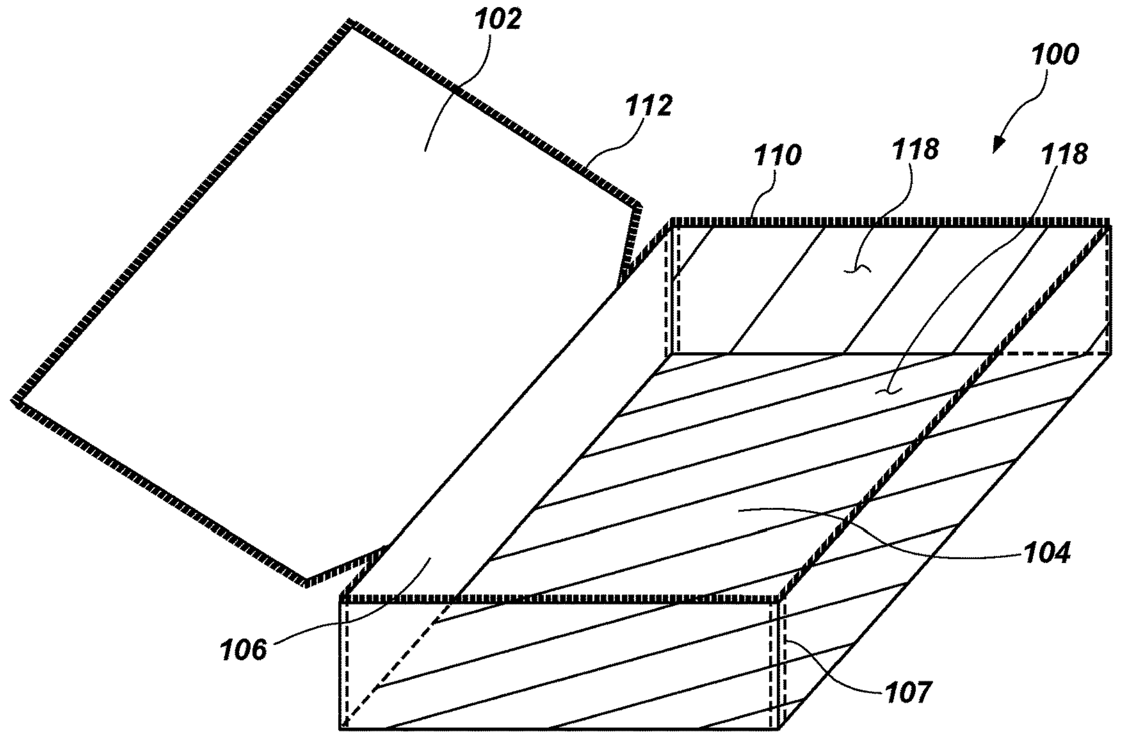
FIG. 2 is a perspective view of the exterior, first cover of FIG. 1 in an open state.

FIGS. 1 and 2 illustrate an exterior, first cover 100 in a closed state and an open state, respectively. In the closed state, a cushioning element 200 (FIG. 3) may be provided and encased (e.g., enclosed) within the first cover 100. In the open state, the cushioning element 200 may be removable from the first cover 100. As illustrated in FIG. 2, the cushioning element 200 has been removed from the first cover 100. When the cushioning element 200 is enclosed within the first cover 100, the cushioning element 200 and the first cover 100 may be collectively referred to as a "cushion." The first cover 100 is further illustrated in an inverted view (e.g., rotated 180°) from a position in which the first cover 100 having the cushion element 200 disposed therein may be provided for use. Accordingly, when the cushioning element 200 is contained within the first cover 100, a bottom layer 102 will be provided against a surface over which the cushion is disposed during use. In some embodiments, the cushion may be provided on a flooring surface and used to provide support to an animal standing, laying, sitting, or kneeling thereon.

The first cover 100 comprises the bottom layer 102, a top layer 104, and sidewalls 106 extending substantially vertically between the bottom layer 102 and the top layer 104. In some embodiments, one or more of the bottom layer 102, the sidewalls 106, and the top layer 104 may be formed from a unitary sheet such that one or more of the bottom layer 102, the sidewalls 106, and the top layer 104 may be formed of a single, continuous layer of material. In such embodiments, a boundary of each sidewall 106 with the top layer 104 may be seamless, and a boundary between at least one sidewall 106 and the bottom layer 102 may be seamless. The sidewalls 106 may be coupled together by seams 107 extending vertically along a boundary between adjacent sidewalls 106. The seams 107 may be formed by sewing, stitching, or serging, by an adhesive, such as tape or glue, and/or mechanical fasteners.

As previously described, the cushioning element 200 may be repeatedly removable (e.g., separable) from the first cover 100. Accordingly, the first cover 100 may comprise a resealable element, such as a zipper 108. In some embodiments, the bottom layer 102 may be removably coupled to the sidewalls 106 by the zipper 108. The zipper 108 may extend partially or substantially entirely about a perimeter of the first cover 100. The zipper 108 includes a first row of protruding teeth 110 coupled to an edge of the sidewalls 106 adjacent the bottom layer 102 and a second row of protruding teeth 112 coupled to an edge of the bottom layer 102. The zipper 108 may extend at least partially or substantially entirely along a length of each side of bottom layer 102 and sidewalls 106. Decorative piping 109 may be provided adjacent the zipper 108 to conceal the zipper 108 from view. In some embodiments, the decorative piping 109 may be provided about a perimeter of the bottom layer 102 and/or about a perimeter of the sidewalls 106.

An exterior surface of the bottom layer 102 may be provided with a plurality of protruding structures 116. The protruding structures 116 may be attached the bottom layer 102 to contact the surface over which the cushion may be disposed in use and to provide a non-slip or high friction surface against the surface over which the cushion is disposed. In some embodiments, the protruding structures 116 may comprise a non-slip material, such as rubber, silicone, polyester, or other suitable material. The protruding structures 116 may be provided in an ordered or random pattern across a surface area of the exterior surface of the bottom layer 102. By way of example and not limitation, the protruding structure 116 may be provided in ordered rows and columns such that any given protruding structure 116 is separated from another protruding structure 116 in an adjacent row or column by a distance of between about 0.25 inch (0.64 cm) and about 1.0 inch (2.54 cm), or by a distance of about 0.5 inch (1.27 cm).

In some embodiments, the first cover 100 may be selected to comprise a repeatedly launderable material. The first cover 100 may further be selected to comprise a durable material resistant to wear and tear from use by a person or animal, a material resistant against stains and odors, impermeable to liquid, and/or possessing anti-microbial and anti-bacterial properties. In some embodiments, each of the bottom layer 102, the top layer 104, and the sidewalls 106 may be selected to comprise a woven or non-woven fabric. The fabric may comprise a flexible or stretchable material. As used herein, the terms "stretchable" and "stretchable material" mean and include a fabric having the ability to stretch to at least 120% of its undeformed length when pulled (i.e., may increase its length by at least 20%), yet return to its original shape when released. "Two-way" stretchable material stretches in two opposite directions, whereas "four-way" stretchable material stretches in two mutually opposing directions plus two directions perpendicular to the two mutually opposing directions (i.e., in two directions perpendicular to one another and in each direction opposite each of these perpendicular directions).

The fabric of the bottom layer 102, the top layer 104, and sidewalls 106 may be comprised of stretchable fibers. The stretchable fibers may be selected from, for example, spandex (i.e., "a manufactured fiber in which the fiber-forming substance is a long chain synthetic polymer comprised of at least 85% of a segmented polyurethane" (see 16 C.F.R. § 303.7)), natural or synthetic rubber, olefins, polyesters, polyethers, etc., and combinations thereof. The bottom layer 102, the top layer 104, and sidewalls 106 may also be comprised of non-stretchable fiber. The non-stretchable fibers may be selected from, for example, viscose (e.g., rayon) or cotton. In some embodiments, the stretchable fibers may be selected to comprise a majority by weight of the bottom layer 102, the top layer 104, and sidewalls 106. By way of example, the stretchable fibers may comprise at least about 50% by weight, at least about 75% by weight, or at least about 85% by weight of each of the bottom layer 102, the top layer 104, and sidewalls 106, and the remaining percent by weight of each of the bottom layer 102, the top layer 104, and sidewalls 106 may be comprised of the non-stretchable fibers.

An interior surface of the first cover 100 may be treated such that the first cover 100 is rendered impermeable to liquid through the first cover 100. In such embodiments, the interior surface of the first cover 100 includes a coating 118 of liquid impermeable material. By way of example, the coating 118 may comprise thermoplastic polyurethane. The composition of the coating 118 may further render the coating 118 anti-microbial, anti-bacterial, and odor resistant. In some embodiments, the interior surface of at least one of the bottom layer 102, the top layer 104, and sidewalls 106 may be provided with the coating 118. As shown in FIG. 2, the interior surface of each of the sidewalls 106 and top layer 104 may be provided with the coating 118. In other embodiments, all interior surfaces of the first cover 100 may have the coating 118 adhered thereto. The coating 118 may be bonded directly to the fabric of the first cover 100. In some embodiments, the fabric of the first cover 100 may have openings or pores that permit liquid to flow therethrough. The coating 118 may be applied to close (e.g., block) any openings or pores of the fabric and to prevent liquid from passing through the cover 100 and rendering the cover 100 impermeable to liquid permeation. The coating 118 may be applied to a substantially constant thickness. The coating 118 may be applied to have a weight per unit area of between about 40 $g/m^2$ and about 80 $g/m^2$ and, more particularly, about 60 $g/m^2$.

The first cover 100 is sized and configured to entirely enclose the cushioning element 200 therein. In some embodiments, the first cover 100 is sized to provide a tight fit with the cushioning element 200. Accordingly, interior surfaces of the first cover 100 may contact exterior surfaces of the cushioning element 200 without providing sufficient space for air pockets or gaps between the first cover 100 and the cushioning element 200 to form. Put differently, the first cover 100 is sized and configured such that an interior volume of the first cover 100 defined by interior surfaces of the first cover 100 is substantially equal to a volume of the cushioning element 200 defined by exterior surfaces of the cushioning element 200.

Figures 3, 4, 5:
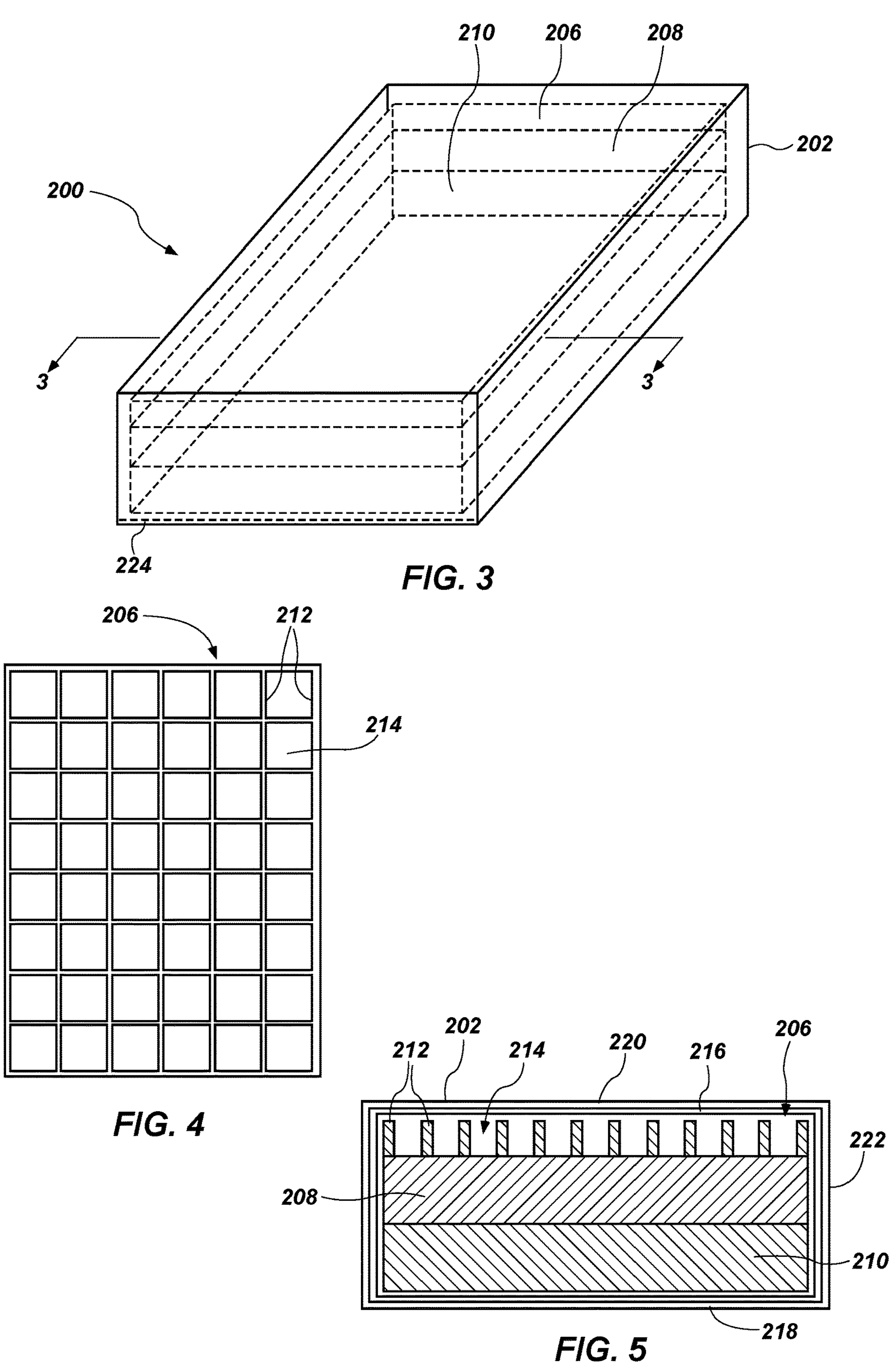
FIG. 3 is a perspective view of a cushioning element for a cushion to be provided within the exterior, first cover of FIG. 1 according to embodiments of the present disclosure.
FIG. 4 is a top view of the cushioning element of FIG. 3.
FIG. 5 is a cross-sectional view of the cushioning element of FIG. 3.

FIGS. 3 and 5 illustrate a perspective view and a top view, respectively, of the cushioning element 200. FIG. 4 illustrates a cross-sectional view of the cushioning element 200 taken along the line 3-3 of FIG. 3. The cushioning element 200 includes an interior, second cover 202 that entirely encloses deformable, cushioning layers, which are illustrated in dashed lines in FIG. 3 as the cushioning layers may not be visible through the second cover 202.

As illustrated in FIGS. 1 through 3, the first cover 100 and the cushioning element 200 may have a generally rectangular prism shape. However, the shape of the first cover 100 and the cushioning element 200 is not so limited and may have any other shape, including cylindrical, triangular, etc. The cushioning element 200 may have any selected dimensions based on the intended use. For example, if the cushioning element 200 is for a small animal cushion, the cushioning element 200 may be approximately 19 inches (48.26 cm) by 26 inches (66.04 cm) with a thickness of about 5 inches (12.70 cm). If the cushioning element 200 is for a medium animal cushion, the cushioning element 200 may be approximately 29 inches (73.66 cm) by 38 inches (96.52 cm) with a thickness of about 5 inches (12.70 cm). If the cushioning element 200 is for a large animal cushion, the cushioning element 200 may be approximately 38 inches (96.52 cm) by 50 inches (127 cm) with a thickness of about 5 inches (12.70 cm).

The second cover 202 may be sized and configured to entirely enclose the cushioning layers therein. In some embodiments, the second cover 202 is sized to provide a tight fit with the cushioning layers such that interior surfaces of the second cover 202 may contact exterior surfaces of the cushioning layers without providing sufficient space for air pockets or gaps between the cushioning layers and the second cover 202 to form. Put differently, the second cover 202 is sized and configured such that an interior volume of the second cover 202 defined by interior surfaces of the second cover 202 is substantially equal to a volume of the cushioning layers defined by exterior surfaces of the cushioning layers. In some embodiments, the second cover 202 may be unbonded from the cushioning layers such that the cushioning layers and the second cover 202 are not held together (e.g., bonded, attached) by adhesives, fasteners, and the like.

Unlike the first cover 100, the second cover 202 permanently encloses the cushioning layers therein. In other words, the second cover 202 is not configured to be repeatedly removable from the cushioning layers therein and is not removable from the cushioning layers enclosed therein without destruction of the second cover 202. Accordingly, the second cover 202 lacks resealable elements such as zippers.

The second cover 202 comprises a bottom layer 218, a top layer 220, and sidewalls 222 extending substantially vertically between the bottom layer 218 and the top layer 220. In some embodiments, one or more of the bottom layer 218, the sidewalls 222, and the top layer 220 may be formed from a unitary sheet such that one or more of the bottom layer 218, the sidewalls 222, and the top layer 220 may be formed of a single, continuous layer of material. In some embodiments, the second cover 202 has the shape of a rectangular prism including six walls. However, the shape of the second cover 202 is not so limited and may have any other shape, including cylindrical, triangular, etc. The second cover 202 may be formed as a sleeve, which is comprised of the bottom layer 218, the top layer 220, and three of the four sidewalls 222, and have an opening along a lateral side of the cover 202, which is comprised of the remaining, fourth sidewall 222. The fourth sidewall 222 may be integrally formed with one of the top layer 220 and the bottom layer 218 but is initially uncoupled from the other of the bottom layer 218 and the top layer 220. The cushioning element 200 is formed by inserting the cushioning layers into the second cover 202 such that the second cover 202 extends over five sides of the cushioning layers through the opening defined by the open lateral sidewall 222. The lateral sidewall 222 may be attached to the remaining sidewalls 222 and the top layer 220 or bottom layer 218 by a seam 224 extending along the lateral sidewall 222. The second cover 202 may lack any other seams to reduce the possible entry points of liquid through the second cover 202.

The second cover 202 may comprise a material resistant against stains and odors, impermeable to liquid, and/or possessing anti-microbial and anti-bacterial qualities. The second cover 202 may be selected to comprise a woven or non-woven fabric. The second cover 202 may further be selected to comprise a stretchable material. The stretchable material of the second cover 202 may include, for example, stretchable fibers. Stretchable fibers include, for example, spandex, natural or synthetic rubber, olefins, polyesters, polyethers, etc., and combinations thereof. In some embodiments, the second cover 202 may be comprised of one or more elastomeric fibers. By way of example and not limitation, the second cover 202 may comprise interwoven polyester fibers and spandex fibers. The spandex fibers may comprise at least about 1% by weight of the second cover 202, such as from about 3% to about 20% by weight or from about 8% to about 15% by weight, and the polyester fibers may comprise the remaining percent by weight of the second cover 202. The second cover 202 may be substantially free of non-stretchable material.

In some embodiments, the second cover 202 may be provided with a coating 216 (FIG. 5). The coating 216 may be provided along at least one interior surface of the second cover 202. In some embodiments, the coating 216 may be provided along an interior surface at least one of the top layer 220, the sidewalls 222, and the bottom layer 218 of the second cover 202. In other embodiments, the coating 216 may be provided along all interior surfaces of the second cover 202. The coating 216 may comprise a liquid impermeable material as previously described regarding the coating 118 of the first cover 100. The coating 216 may be bonded directly to the fabric of the second cover 202. In some embodiments, the fabric of the second cover 202 may have openings or pores that permit liquid to flow therethrough. The coating 216 may be applied to close (e.g., block) any openings or pores of the fabric and to prevent liquid from passing through the cover 202 and rendering the cover 202 impermeable to liquid. The coating 216 may be applied to a substantially constant thickness. The coating 216 may be applied to have a weight per unit area of between about 20 $g/m^2$ and about 60 $g/m^2$ and, more particularly, about 45 $g/m^2$.

The cushioning layers enclosed by the second cover 202 may comprise a plurality of stacked layers including an elastomeric material layer 206 and at least one foam layer. In some embodiments, as illustrated in FIG. 3, a top layer comprises the elastomeric material layer 206, a middle layer comprises a first foam layer 208, and a bottom layer comprises a second foam layer 210. In other embodiments, the elastomeric material layer 206, the first foam layer 208, and the second foam layer 210 may be provided in a different order. In yet other embodiments, the cushioning element 200 may comprise additional layers of material. Each of the elastomeric material layer 206, the first foam layer 208, and the second foam layer 210 may be fixed to each other, for example, using an adhesive or laminate.

In some embodiments, the first foam layer 208 and the second foam layer 210 may have different material properties. For example, the first foam layer 208 may comprise a softer and/or less dense foam compared to the second foam layer 210. The first foam layer 208 may comprise a flexible foam having an indentation load deflection (ILD) of 36 and a density of 1.8 $lb/ft^3$, and the second foam layer 210 may comprise a flexible foam having an ILD of 18 and a density of 2.0 $lb/ft^3$.

As illustrated in FIG. 4, the elastomeric material layer 206 may comprise intersecting buckling walls 212 that are interconnected and define hollow columns 214 or voids. Though the buckling walls 212 are depicted as intersecting at right angles, the buckling walls 212 may be in any selected configuration. For example, the buckling walls 212 may be configured to form triangular hollow columns 214, hexagonal hollow columns 214, skewed parallelogram hollow columns 214, etc. In some embodiments, the thickness of the elastomeric material layer 206 may be between about 0.5 inch (1.27 cm) and about 2 inches (5.08 cm), such as about 1 inch (2.54 cm). The thickness of the elastomeric material layer 206 may vary based on the thickness of other parts of the cushioning element 200.

The elastomeric material layer 206 may include, for example, an elastomeric cushioning material as described in U.S. Pat. No. 7,076,822, "Stacked Cushions," issued Jul. 18, 2006; U.S. Pat. No. 7,730,566, titled "Multi-Walled Gelastic Material," issued Jun. 8, 2010; U.S. Pat. No. 8,075,981, titled "Alternating Pattern Gel Cushioning Elements and Related Methods," issued Dec. 13, 2011; U.S. Pat. No. 8,434,748, titled "Cushions Comprising Gel Springs," issued May 7, 2013 (hereinafter "the '748 Patent"); U.S. Pat. No. 8,628,067, titled "Cushions Comprising Core Structures and Related Methods," issued Jan. 14, 2014 (hereinafter "the '067 Patent"); U.S. Pat. No. 8,919,750, titled "Cushioning Elements Comprising Buckling Walls and Methods of Forming Such Cushioning Elements," issued Dec. 30, 2014 (hereinafter "the '750 Patent") U.S. Pat. No. 8,932,692, titled "Cushions Comprising Deformable Members and Related Methods," issued Jan. 13, 2015, the entire disclosures of each of which is hereby incorporated herein by this reference.

While FIG. 3 illustrates the elastomeric material layer 206 as intersecting buckling walls 212 having hollow columns 214, other structures and configurations may be used. Such additional structures and configurations are described in, for example, the '748 Patent; the '067 Patent; the '750 Patent; and U.S. Pat. No. 8,932,692, titled "Cushions Comprising Deformable Members and Related Methods," issued Jan. 13, 2015, the entire disclosure of each of which is incorporated herein by this reference.

Elastomeric materials that may be used to form the elastomeric material layer 206 and, more particularly, the buckling walls 212 are described in, for example, U.S. Pat. No. 5,994,450, "Gelatinous Elastomer and Methods of Making and Using the Same and Articles Made Therefrom," issued Nov. 30, 1999; U.S. Pat. No. 7,964,664, "Gel with Wide Distribution of MW in Mid-Block," issued Jun. 21, 2011; and U.S. Pat. No. 4,369,284, "Thermoplastic Elastomer Gelatinous Compositions," issued Jan. 18, 1983; the disclosures of each of which are incorporated herein in their entirety by this reference. The elastomeric material may include an elastomeric polymer and a plasticizer. The elastomeric material may be a gelatinous elastomer (also referred to in the art as gel, elastomer gel, or elastomeric gel), a thermoplastic elastomer, a natural rubber, a synthetic elastomer, a blend of natural and synthetic elastomers, etc.

The elastomeric polymer may be an A-B-A triblock copolymer such as styrene ethylene propylene styrene (SEPS), styrene ethylene butylene styrene (SEBS), and styrene ethylene ethylene propylene styrene (SEEPS). For example, A-B-A triblock copolymers are currently commercially available from Kuraray America, Inc., of Houston, Tex., under the trade name SEPTON® 4055, and from Kraton Polymers, LLC, of Houston, Tex., under the trade names KRATON® E1830, KRATON® G1650, and KRATON® G1651. In these examples, the "A" blocks are styrene. The "B" block may be rubber (e.g., butadiene, isoprene, etc.) or hydrogenated rubber (e.g., ethylene/propylene or ethylene/butylene or ethylene/ethylene/propylene) capable of being plasticized with mineral oil or other hydrocarbon fluids. The elastomeric material may include elastomeric polymers other than styrene-based copolymers, such as non-styrenic elastomeric polymers that are thermoplastic in nature or that can be solvated by plasticizers or that are multi-component thermoset or cross-linked elastomers.

The elastomeric material may include one or more plasticizers, such as hydrocarbon fluids. For example, elastomeric materials may include aromatic-free food-grade white paraffinic mineral oils, such as those sold by Sonneborn, Inc., of Mahwah, N.J., under the trade names BLANDOL® and CARNATION®.

In some embodiments, the elastomeric material may have a plasticizer-to-polymer ratio from about 0.1:1 to about 50:1 by weight. For example, elastomeric materials may have plasticizer-to-polymer ratios from about 1:1 to about 30:1 by weight, or even from about 1.5:1 to about 10:1 by weight. In further embodiments, elastomeric materials may have plasticizer-to-polymer ratios of about 4:1 by weight.

The elastomeric material may have one or more fillers (e.g., lightweight microspheres). Fillers may affect thermal properties, density, processing, etc., of the elastomeric material. For example, hollow microspheres (e.g., hollow glass microspheres or hollow acrylic microspheres) may decrease the thermal conductivity of the elastomeric material by acting as an insulator because such hollow microspheres (e.g., hollow glass microspheres or hollow acrylic microspheres) may have lower thermal conductivity than the plasticizer or the polymer. As another example, metal particles (e.g., aluminum, copper, etc.) may increase the thermal conductivity of the resulting elastomeric material because such particles may have greater thermal conductivity than the plasticizer or polymer. Microspheres filled with wax or another phase-change material (i.e., a material formulated to undergo a phase change near a temperature at which a cushioning element may be used) may provide temperature stability at or near the phase-change temperature of the wax or other phase-change material within the microspheres (i.e., due to the heat of fusion of the phase change). The phase-change material may have a melting point from about 20° C. to about 45° C.

The elastomeric material may also include antioxidants. Antioxidants may reduce the effects of thermal degradation during processing or may improve long-term stability. Antioxidants include, for example, pentaerythritol tetrakis(3-(3,5-di-tert-butyl-4-hydroxyphenyl) propionate), commercially available as IRGANOX® 1010, from BASF Corp., of Iselin, N.J. or as EVERNOX®-10, from Everspring Corp., USA, of Los Angeles, Calif. octadecyl-3-(3,5-di-tert-butyl-4-hydroxyphenyl)propionate, commercially available as IRGANOX® 1076, from BASF Corp. or as EVERNOX® 76, from Everspring Chemical; and tris(2,4-di-tert-butylphenyl)phosphite, commercially available as IRGAFOS® 168, from BASF Corp. or as EVERFOS® 168, from Everspring Corp., USA. One or more antioxidants may be combined in a single formulation of elastomeric material. The use of antioxidants in mixtures of plasticizers and polymers is described in columns 25 and 26 of U.S. Pat. No. 5,994,450, previously incorporated by reference. The elastomeric material may include up to about 5 wt % antioxidants. For instance, the elastomeric material may include from about 0.10 wt % to about 1.0 wt % antioxidants.

In some embodiments, the elastomeric material may include a resin. The resin may be selected to modify the elastomeric material to slow a rebound of the elastomeric material layer 206 after deformation. The resin, if present, may include a hydrogenated pure monomer hydrocarbon resin, such as those commercially available from Eastman Chemical Company, of Kingsport, Tenn., under the trade name REGALREZ®. The resin, if present, may function as a tackifier, increasing the stickiness of a surface of the elastomeric material.

In some embodiments, the elastomeric material may include a pigment or a combination of pigments. Pigments may be aesthetic and/or functional. That is, pigments may provide an elastomeric material layer 206 with an appearance appealing to consumers. In addition, an elastomeric material layer 206 having a dark color may absorb radiation differently than an elastomeric material layer 206 having a light color.

The elastomeric material may include any type of gelatinous elastomer. For example, the elastomeric material may include a melt-blend of one part by weight of a styrene-ethylene-ethylene-propylene-styrene (SEEPS) elastomeric triblock copolymer (e.g., SEPTON® 4055) with four parts by weight of a 70-weight straight-cut white paraffinic mineral oil (e.g., CARNATION® white mineral oil) and, optionally, pigments, antioxidants, and/or other additives.

The elastomeric material may include a material that returns to its original shape after deformation, and that may be elastically stretched. The elastomeric material may be rubbery in feel, but may deform to the shape of an object applying a deforming pressure better than conventional rubber materials, and may have a durometer hardness lower than conventional rubber materials. For example, the elastomeric material may have a hardness on the Shore A scale of less than about 50, from about 0.1 to about 50, or less than about 5.

The elastomeric material may be generally nonsticky, such that the elastomeric material layer 206 may return to its original shape after a load is removed. That is, the elastomeric material may be sufficiently nonsticky so that buckling walls 212 do not stick to one another or do not remain stuck to one another after a deforming force is removed. In some embodiments, the buckling walls 212 may include a coating to make the surfaces of the elastomeric material nonsticky. Thus, any contact between adjacent buckling walls 212 may cease immediately or soon after the force is removed. The elastomeric material may be formulated to have any selected stickiness or tackiness, such as to control the rate of response to removal of a load.

Application of a force on the buckling walls 212 (e.g., weight of the cushioned object) causes a compression force on the buckling walls 212. When the applied force to a particular buckling wall 212 exceeds a certain threshold value, that buckling wall 212 buckles, reducing the amount of force carried by that particular buckling wall 212 in comparison to the load it would have carried had it been constrained against buckling (e.g., resulting in a reduced slope of an associated stress-strain curve or load-deflection curve after buckling). The force on nearby buckling walls 212 may increase or change direction due to lateral transfer of the load through the buckling walls 212.

The buckling of the buckling walls 212 may relieve pressure in the location of the buckling by decreasing the amount of the load carried by the buckled buckling walls 212 in comparison to the load they would have carried had they been constrained against buckling. Thus, a load may be transferred to other portions of the elastomeric material layer 206. Transfer of all or a portion of the load to other portions of the elastomeric material layer 206 may reduce peak pressure, which may increase comfort for humans or animals. Such a load transfer may be particularly beneficial when an irregularly shaped object is placed against the buckling walls 212.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure as contemplated by the inventors.

What is claimed is:

1. A cushion comprising:

a cushioning element including an elastomeric material layer and at least one foam layer, the elastomeric material layer defining a plurality of intersecting buckling walls forming hollow columns extending between opposing faces of the elastomeric material layer, wherein the plurality of intersecting buckling walls (i) include a non-stick elastomeric gel coating and (ii) are bonded to the at least one foam layer via lamination such that the at least one foam layer is fixed to the elastomeric material layer;

an interior cover enclosing the cushioning element, the interior cover formed of a stretchable woven fabric defining a plurality of pores extending through the stretchable woven fabric, and the interior cover comprising a first liquid-impermeable layer formed of a thermoplastic polyurethane layer on all interior surfaces of the interior cover to seal the plurality of pores;

an exterior cover enclosing the interior cover and the cushioning element, the exterior cover formed of a woven material different than the interior cover, and the exterior cover comprising a second liquid-impermeable layer formed of a thermoplastic polyurethane layer of a different thickness than the first liquid-impermeable layer of the interior cover, wherein the second liquid-impermeable layer is on interior surfaces of the exterior cover except for an interior surface of a bottom layer of the exterior cover; and a plurality of protrusions comprising a non-slip material on an exterior surface of the bottom layer of the exterior cover, wherein the non-slip material is different from the material of the bottom layer.

2. The cushion of claim 1, wherein each of the exterior cover and the interior cover comprises fabric formed of stretchable fibers.

3. The cushion of claim 2, wherein the fabric of the interior cover is substantially free of non-stretchable fibers.

4. The cushion of claim 2, wherein the fabric of the exterior cover further comprises non-stretchable fibers.

5. A cushion comprising:

a cushioning element including an elastomeric material layer and at least one foam layer, the elastomeric material layer defining a plurality of intersecting buckling walls forming hollow columns of uniform cross-section extending between opposing faces of the elastomeric material layer, wherein the plurality of intersecting buckling walls (i) include a non-stick elastomeric gel coating and (ii) are bonded to the at least one foam layer via lamination such that the at least one foam layer is fixed to the elastomeric material layer;

an interior cover permanently enclosing the cushioning element, the interior cover formed of a stretchable woven fabric defining a plurality of pores extending through the stretchable woven fabric, and the interior cover comprising a first liquid-impermeable layer formed of a thermoplastic polyurethane layer on all interior surfaces of the interior cover to seal the plurality of pores;

an exterior cover removably enclosing the interior cover and the cushioning element, the exterior cover formed of a woven material different than the interior cover, and the exterior cover comprising a second liquid-impermeable layer formed of a thermoplastic polyurethane layer of a different thickness than the first liquid-impermeable layer of the interior cover, wherein the second liquid-impermeable layer is on interior surfaces of the exterior cover except for an interior surface of a bottom layer of the exterior cover; and a plurality of protrusions comprising a non-slip material on an exterior surface of the bottom layer of the exterior cover, wherein the non-slip material is different from the material of the bottom layer.

6. The cushion of claim 5, wherein the at least one foam layer of the cushioning element comprises a first foam layer and a second foam layer.

7. The cushion of claim 6, wherein the first foam layer is less dense than the second foam layer.

8. The cushion of claim 7, wherein the first foam layer is provided between and fixed to the elastomeric material layer and the second foam layer.

9. The cushion of claim 5, wherein the interior cover is sized and configured to provide a tight fit such that an interior volume of the interior cover defined by interior surfaces of the interior cover is substantially equal to a volume of the cushioning element defined by exterior surfaces of the cushioning element.

10. The cushion of claim 5, wherein the interior cover is unbonded from the cushioning element.

11. The cushion of claim 5, wherein each of the interior cover and the exterior cover comprises a stretchable material.

12. A cushion comprising:

a cushioning element including an elastomeric material layer and at least one foam layer, the elastomeric material layer comprising a plurality of intersecting buckling walls defining hollow columns of uniform cross-section extending between opposing faces of the elastomeric material layer, wherein the plurality of intersecting buckling walls (i) include a non-stick elastomeric gel coating and (ii) are bonded to the at least one foam layer via lamination such that the at least one foam layer is fixed to the elastomeric material layer;

an interior cover enclosing the cushioning element, the interior cover formed of a stretchable woven fabric defining a plurality of pores extending through the stretchable woven fabric;

a first liquid-impermeable layer formed of a thermoplastic polyurethane layer provided on interior surfaces of the interior cover to seal the plurality of pores;

an exterior cover removably enclosing the interior cover and the cushioning element, the exterior cover formed of a woven material different than the interior cover;

a second liquid-impermeable layer formed of a thermoplastic polyurethane layer of a different thickness than the first liquid-impermeable layer of the interior cover, wherein the second liquid-impermeable layer is provided on interior surfaces of the exterior cover except for an interior surface of a bottom layer of the exterior cover; and a plurality of protrusions comprising a non-slip material on an exterior surface of the bottom layer of the at least one cover, wherein the non-slip material is different from the material of the bottom layer.

13. The cushion of claim 1, wherein the first liquid-impermeable coating has a weight per unit area of between 20 $g/m^2$ and 60 $g/m^2$.

14. The cushion of claim 1, wherein the second liquid-impermeable coating has a weight per unit area of between 40 $g/m^2$ and 80 $g/m^2$.

* * * * *